United States Patent [19]
Yeo

[11] Patent Number: 5,880,183
[45] Date of Patent: Mar. 9, 1999

[54] TWO-COMPONENT POLYMER COMPOSITION

[76] Inventor: Siew Puat Yeo, 60-D, St Thomas Walk, Singapore, 238138

[21] Appl. No.: 952,906
[22] PCT Filed: Apr. 9, 1996
[86] PCT No.: PCT/SG96/00002
  § 371 Date: Nov. 24, 1997
  § 102(e) Date: Nov. 24, 1997
[87] PCT Pub. No.: WO96/37551
  PCT Pub. Date: Nov. 28, 1996

[30]  Foreign Application Priority Data

May 26, 1995 [SG] Singapore ........................... 9500525-2
Jul. 19, 1995 [GB] United Kingdom ................... 9514781

[51] Int. Cl.$^6$ .............................. C08L 1/02; C08L 31/04; C08L 29/04; C09J 131/04
[52] U.S. Cl. ............................ 524/13; 524/425; 524/426; 524/447; 524/451; 524/522; 524/57; 524/194; 525/57; 525/194; 427/392; 427/393; 156/327; 156/331.2; 156/332

[58] Field of Search ......................... 525/57, 194; 524/13, 524/425, 426, 447, 451, 522; 156/327, 332, 331.2; 427/392, 393

[56]  References Cited

U.S. PATENT DOCUMENTS 5,059,264  10/1991  Sheets ...................................... 427/393

OTHER PUBLICATIONS

Chemical Abstract 100:129814 (of JP57176063).

*Primary Examiner*—David Buttner
*Attorney, Agent, or Firm*—Abelman, Frayne & Schwab

[57] ABSTRACT

A composition of a hydroxyl functional polymer, an acetate functional polymer and a carboxyl functional polymer, which are crosslinked by a polyfunctional aziridine. Preferably, PVOH, polyvinylacetate and a carboxylated styrene/butadiene are used as the polymers. The aziridine can be held separate from the polymers prior to crosslinking. The composition is useful as a wood adhesive or coating composition.

24 Claims, No Drawings

TWO-COMPONENT POLYMER COMPOSITION

The present invention relates to compositions which are especially suitable for use in the paper and woodworking and related fields. The present compositions find particular, but not exclusive use, as adhesives, binding, coating and sealing materials.

Many adhesives currently available, particularly for use in woodworking, contain polyvinyl alcohol (PVOH) or a dispersion of another polymer such as polyvinyl acetate in polyvinyl alcohol (PVAc) (PVOH). The adhesives operate by forming a physical bond with the wood substrate. In this respect the —OH groups in the adhesive composition and the —OH groups from cellulose in the wood substrate together form strong hydrogen bonds. Problems arise with such adhesives in that they exhibit poor water resistance. This limits the number of potential uses for such adhesives. The inherent moisture content of the wood substrate can also cause difficulties for such adhesives.

Also, many existing products in use in the woodworking field require metal salt catalysts in their crosslinking or curing reaction such as aluminium chloride and chromium nitrate, for example. Use of such metal salts has disadvantages in terms of safety for both manufacturing and handling of the adhesive. Also, many of the formulations presently available have a low pH value (approximately 3) which can give rise to discoloration of wood which contains tanin.

British patent GB 1423558 discloses a wood glue which uses a polyisocyanate crosslinker. These are, however, highly toxic and environmentally unfriendly chemicals. Aziridines have been used as crosslinkers for polymeric injection moulding compositions (GB 1424041) and in glues for amine-containing synthetics (JP 1026689).

The present invention seeks to alleviate at least some of the aforementioned problems.

With this aim in mind, in one aspect the present invention concerns a two part pack including components A and B, wherein Component A contains
  Ai) a solution or dispersion which includes a polymer containing units having hydroxyl groups; and
  Aii) a polymer derived from an optionally substituted styrene monomer, said polymer containing units having carboxyl groups; and
wherein Component B comprises
  Bi) a crosslinker, comprising a polyfunctional aziridine, the crosslinker being capable of crosslinking with at least one carboxyl group and at least one hydroxyl group.

In this aspect of the invention, suitably both components A and B are in liquid form. In preferred embodiments the pack includes a first openable compartment containing both components Ai) and Aii) and a second openable compartment containing component Bi).

In another aspect the present invention provides a composition obtainable by crosslinking Ai) a polymer containing hydroxyl units and Aii) a polymer derived from an optionally substituted styrene monomer, said polymer containing units having carboxyl groups, with Bi) a polyfunctional aziridine crosslinker which is capable of crosslinking with hydroxyl groups and with carboxyl groups.

In another aspect the present invention also relates to use of a composition obtainable by crosslinking Ai) a polymer containing hydroxyl units and Aii) a polymer derived from an optionally substituted styrene monomer, said polymer containing units having carboxyl groups, with Bi), a polyfunctional aziridine crosslinker as a protective coating, especially for products derived from or containing cellulose, including paper and wood products.

A yet further aspect of the present invention concerns use of a composition obtainable by crosslinking Ai) a polymer containing hydroxyl units; and Aii) a polymer derived from an optionally substituted styrene monomer, said polymer containing units having carboxyl groups; with Bi) a polyfunctional aziridine crosslinker as an adhesive, especially for wood products and other products derived from or containing cellulose.

Other aspects of the present invention concern methods of providing protective coatings especially for wood and paper products and methods for adhering surfaces of wood and paper products to other substrates. Preferably the methods of coating include applying the present compositions in the form of a spray. Suitably the method of adhering substrates involves applying the compositions to one substrate using brushes, rollers etc.

In some preferred embodiments Component Ai) is in the form of an aqueous solution of polyvinyl alcohol. The polyvinyl alcohol may be selected from both low and high molecular weight polymers. Also, polyvinyl alcohols of various degrees of hydrolysis may be employed. The appropriate choice of polyvinyl alcohol will depend upon the desired characteristics of the composition, for example the desired viscosity.

In other preferred embodiments component Ai) is an aqueous dispersion of a polymer which includes polyvinylalcohol as a stabiliser. Preferably any such polymers include units having acetate groups which are popular for use in the woodworking field, but many other types of polymer are suitable. Preferred polymers containing units having acetate groups include polyvinyl acetate homopolymers or copolymers, most preferably as a dispersion with polyvinyl alcohol. Other example polymers as component Ai) include ethylene vinyl acetate copolymers and terpolymer dispersions. Preferably any component Ai) is water miscible. It is also preferred that the polymer has a viscosity of between about 20,000 and 80,000 mPas when measured at 23° C. Preferably any such dispersion has a solids content of from about 35% to about 65%. Any such polymers which include units having acetate groups may be used alone or in combination.

Preferably the component Aii) comprises a carboxylated styrene butadiene rubber latex. It is also preferred that any component Aii) be water miscible. Preferably the component has a solids content of from about 30% to about 70%.

In addition to Ai) and Aii), component A may optionally additionally include filler materials. Any such filler materials are desirable for improving water resistance. Example fillers include talc, silica, kaolin or calcium carbonate. Preferably, one or more such fillers are provided in fine powder form or as a suspension in water.

The amount of any filler employed may be varied in accordance with the desired end properties of the composition. The fillers may prevent excessive penetration of the composition into the substrate. They may also impart better water resistance and film hardness to the final adhesive/coating. Suitably component A includes no more than about 70 weight % filler(s). Preferably the component A includes up to about 50 weight % filler, preferably from about 1% to about 50%, most preferably between 30 and 45%. Component A may also additionally include agents to ease its storage and handling, as are common in this field. Component A may also include other agents for modifying the properties of the crosslinked film product. Optional additional agents/ingredients include thickening agents (e.g. a polyacrylic or cellulose thickener such as methyl cellulose or hydroxyl ethyl cellulose, aromatic solvents, and plasticisers (e.g. dibutyl phthalate or butyl benzyl phthalate) to improve flexibility of the final polymer film.

Various weight ratios of components Ai) and Aii) may be employed, depending upon the desired characteristics of the composition. Preferably the ratio of Ai) to Aii) ranges from about 1:10 to about 10:1. Most preferably, component A includes approximately equal weight quantities of Ai) and Aii). If the relative amount of Ai) is increased beyond this level, this results in a decrease in the water and heat resistance of the subsequent composition. On the other hand, if the level of component Aii) is increased this results in a reduction in the bonding strength of the subsequent composition.

In the various aspects of the present invention the polyfunctional crosalinker is one which is capable of crosslinking with a hydroxyl group from component Ai) and a carboxyl group from component Aii)

The crosslinker Bi) comprises a polyfunctional aziridine crosalinker. It is especially preferred that the aziridine crosslinker is trifunctional and most preferably it has the following formula:

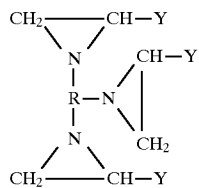

wherein Y is a lower alkyl group of from 1 to about 4 carbon atoms. Preferably Y is a methyl group. R is a polymer chain. A particularly preferred polyfunctional aziridine crosslinker in which Y is methyl is commercially available. The crosslinker is designated CAS number 64265-57-2.

Suitably the component B is added at a level of no more than about 10 weight % to component A, preferably at the level of between about 1 to 5 weight % component A, and most preferably at about 3 weight % to component A.

Most preferably the crosslinker is water miscible. An aqueous dispersion of the crosslinker may be stabilised with the aid of solvents such as methylglycol acetate and glycol solvents, for example.

Such a trifunctional aziridine crosslinker may crosslink components Ai) and Aii) and the wood substrate as follows:

Reaction with carboxyl group in Aii)

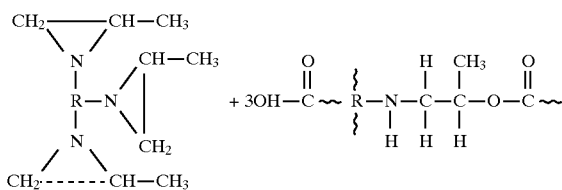

Reaction with hydroxyl group in Ai) and wood substrate

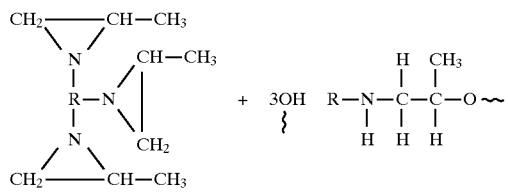

Suitable aziridine crosslinkers are capable of reacting with a carboxyl group at normal room temperature. As a result the present compositions and packs are capable of producing an adhesive effect, or of forming a protective coating, at room temperature.

In preferred embodiments of the invention, appropriate choice of components Ai) Aii) and B may provide an adhesive or coating composition, for example, which is employable at room temperature without the need for additional catalysts as required in prior formulations.

The combination of components A and B in accordance with the present invention gives rise to compositions having improved adhesion and water resistance as compared to products currently available. The prime and preferred application for the present invention is the wood working industries, for example wood bonding, formation of particle board by binding woodchips and wood coating to improve abrasion, chemical and water resistance. However the present invention is also applicable to paper industries, particularly for coating paper to improve water resistance and stiffness. This may be useful in the production of paper cartons.

In this regard, another aspect of the present invention relates to a particle board obtainable by bonding woodchips with a composition comprising components Ai), Aii) and Bi) as defined above.

Suitably, an aziridine crosslinker as component Bi) has a pH of between about 10 and 11, especially about 10.5. Typically component Ai) has a pH of about 4 to 5. Preferably component Aii) is selected so as to have a pH of between about 7.5 to 9.5. In this respect, a composition comprising components Ai), Aii) and Bi) will typically have a pH which is higher than the pH-3 value of prior art compositions. Embodiments of the present invention provide compositions having a pH of between about 6.5 to 8.5, especially approximately 7/8. This has advantages in reducing the possibility of causing discoloration of wood containing tanin.

Suitably, components Ai), Aii) and B are selected to provide an adhesive which has a pot life of 1–5 hours, preferably 3–4 hours.

As discussed above, suitably components Ai), Aii) and B are selected so as to be water miscible. Thus, the present invention also has advantages in providing a cost effective water borne system, which may be free of undesirable solvents such as formaldehyde and phenol. In this regard the present invention has advantages over prior art compositions.

Embodiments of the present invention will now be described further, by way of example, with reference to the accompanying examples:

EXAMPLE

A first example formulation was prepared as follows:

| Component | Parts by weight |
| --- | --- |
| Ai) Homopolymer Polyvinyl Acetate Dispersion (PVOH) Solid content approx. 60%) | 30 p.b.w. |
| Aii) Carboxylated Styrene Butadiene Latex Dispersion (S.C. approx 46–52%) | 30 p.b.w. |
| Aiii) Filler - Paste form (Calcium carbonate powder 60–70% in water) | 40 p.b.w. |
| In can preservative | 0.5 p.b.w. |

A pack contains two compartments, one accommodating Part A and the other accommodating Part B.

Part A is a blend of the above preferred components Ai) to Aiii). Part B (crosslinker) is preferably in an amount of added 3 p.b.w to the compounded dispersion (Part A) before use. In this example B is of Formula I wherein Y is methyl.

The properties of the first example formulation were determined and compared with those of an existing adhesive which is commercially available. The test results are shown below.

Test Results

| | Example 1 | Commercially available adhesive |
| --- | --- | --- |
| Crosslinker | Polyfunctional aziridine | Metal salt catalyst |
| Bonding effect | Chemical Bond | Physical bond |
| Water resistance | Reasonable | Reasonable |
| Solvent resistancy | Reasonable | Poor |
| Abrasion resistance | Reasonable | Poor |
| pH | Approx. 7–8 - low discoloration effect | Approx. 3 - high discoloration effect |
| Setting speed | Fast - readily adjustable | Moderate - difficult to adjust. |
| Ageing time* | Fast - less than 3 hours | Slow - at least 6 hours |

*Ageing relates to the time for which the substrates are left to stand at room temperature after pressing to enable them to be suitable for processing such as by sawing or sanding.

All the proportions in this Example I formulation can be varied subject to the desired end application and cost. However, the above formulation stated has been developed to provide a desirable balance in the end properties such as adhesion, cohesion and film hardness, It will be appreciated that the Example 1 formulation included equal amounts of components Ai) and Aii). The following Examples 2 and 3 illustrate the effect of varying the weight ratios of the two components on the final properties of the crosslinked product. The components Ai), Aii) and Bi) are the same as those employed above; only the weight ratios have been varied.

Example 2

| Component | Parts by weight |
| --- | --- |
| Ai) PVAc Homopolymer (PVOH) dispersion | 54 |
| Aii) XSBR | 6 |
| Aiii) Filler paste | 40 |
| B: as Example 1 | |

Example 3

| | | |
| --- | --- | --- |
| Ai) PVAc Homopolymer (PVOH) dispersion | 6 |
| Aii) XSBR | 54 |
| Aiii) Filler paste | 40 |
| B: as Example 1 | |

Packs were prepared containing a first vessel of components Ai) to Aiii) and a second vessel containing solely component B.

In comparison to the formulation of Example I, the Example 2 formulation exhibited a lower bonding strength and lower water and heat resistance. Also, in comparison to the Example 1 formulation, the product of Example 3 was very low in viscosity and thus was more difficult to apply to the wood substrate. It also gave rise to various levels of bonding strengths depending upon the nature of the wood substrate. It did, however, exhibit good water and heat resistance The above examples illustrate the effects of varying the levels of the respective components in the present packs and compositions. Various modifications may be made to the above Examples.

I claim:

1. A pack containing components A and B, wherein:
   component A comprises Ai) a solution or dispersion comprising a first polymer containing units having hydroxyl groups, and a second polymer containing units having acetate groups, and
   Aii) a third polymer derived from an optionally substituted styrene monomer, said third polymer containing units having carboxyl groups;
   component B comprises
   Bi) a polyfunctional aziridine crosslinker capable of crosslinking with at least one carboxyl group and at least one hydroxyl group.

2. A pack according to claim 1 wherein said first polymer is a homopolymer.

3. A pack according to claim 1 wherein Ai) includes a solution of polyvinyl alcohol as said first polymer.

4. A pack according to claim 1 wherein Ai) includes a dispersion which contains polyvinyl alcohol as said first polymer.

5. A pack according to claim 4 wherein Ai) is a dispersion which includes a polyvinyl acetate homopolymer or copolymer.

6. A pack according to claim 5 wherein Ai) is a dispersion which includes polyvinyl acetate homopolymer.

7. A pack according to claim 4 wherein Ai) includes an ethylene vinyl acetate copolymer or terpolymer.

8. A pack according to claim 1 wherein Aii) comprises a carboxylated styrene butadiene rubber latex.

9. A pack according to claim 1 wherein component A contains Ai) and Aii) in a weight ratio of between 1:10 and 10:1.

10. A pack according to claim 9 wherein component A contains Ai) and Aii) in a weight ratio of between 1:5 and 5:1.

11. A pack according to claim 1 wherein component A contains Ai) and Aii) in a weight ratio of approximately 1:1.

12. A pack according to claim 1 wherein component A additionally contains Aiii) one or more fillers, and/or
  Aiv) one or more preservatives.

13. A pack according to claim 1 wherein component B comprises Bi) a trifunctional aziridine crosslinker of formula I

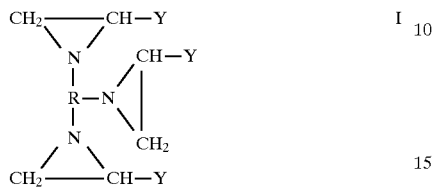

wherein R is a polymer chain and Y is a lower alkyl group of from 1 to 4 carbon atoms.

14. A pack according to claim 13 wherein Bi) is a trifunctional aziridine crosslinker in which Y is methyl.

15. A pack according to claim 1 wherein Bi) is water miscible.

16. A pack according to claim 1 wherein Ai) and Ai ) are water miscible.

17. A pack according to claim 1 wherein components A and B are provided in a weight ratio of from 100 to 10 to 100 to 0.1.

18. A pack according to claim 17 wherein components A and B are provided in a weight ratio of from 100 to 5 and 100 to 0.1.

19. A pack according to claim 1 wherein component A additionally contains one or more fillers selected from calcium carbonate, talc, silica and kaolin.

20. A composition obtained by crosslinking
  Ai) a solution or dispersion comprising a first polymer containing units having hydroxyl groups, and a second polymer containing units having acetate groups; and
  Aii) a third polymer derived from an optionally substituted styrene monomer, said third polymer containing units having carboxyl groups; by means of
  B) a polyfunctional aziridine crosslinker capable of crosslinking with at least one carboxyl group and at least one hydroxyl group.

21. A method of adhering a first cellulosic substrate to a second substrate which method comprises combining a
  component A which comprises Ai) a solution or dispersion comprising a first polymer containing units having hydroxyl groups, and a second polymer containing units having acetate groups; and
  Aii) a third polymer derived from an optionally substituted styrene monomer, said third polymer containing units having carboxyl groups; with
  a component B which comprises Bi) a polyfunctional aziridine crosslinker capable of crosslinking with at least one carboxyl group and at least one hydroxyl group, to provide an adhesive combination; applying the adhesive combination to a region of said first cellulosic substrate and bringing said second substrate into contact with said first region of said first cellulosic substrate.

22. A method of protecting a cellulosic substrate, which comprises combining a component A which comprises
  Ai) a solution or dispersion comprising a first polymer containing units having hydroxyl groups, and a second polymer containing units having acetate groups; and
  Aii) a third polymer derived from an optionally substituted styrene monomer, said third polymer containing units having carboxyl groups; and
  component B which comprises Bi) a polyfunctional aziridine crosslinker capable of crosslinking with at least one carboxyl group and at least one hydroxyl group; and applying the resulting combination to said substrate.

23. A particle board comprising woodchips adhered together with a composition comprising
  a mixture of a component A which comprises Ai) a solution or dispersion comprising a first polymer containing units having hydroxyl groups, and a second polymer containing units having acetate groups; and
  Aii) a third polymer derived from an optionally substituted styrene monomer, said third polymer containing units having carboxyl groups; and
  component B which comprises Bi) a polyfunctional aziridine crosslinker capable of crosslinking with at least one carboxyl group and at least one hydroxyl group.

24. A wood product comprising wood substrates adhered together with a composition comprising a mixture of A which comprises
  Ai) a solution or dispersion comprising a first polymer containing units having hydroxyl groups, and a second polymer containing units having acetate groups; and
  Aii) a third polymer derived from an optionally substituted styrene monomer, said third polymer containing units having carboxyl groups; and
  component B which comprises Bi) a polyfunctional aziridine crosslinker capable of crosslinking with at least one carboxyl group and at least one hydroxyl group.

* * * * *